United States Patent [19]
Christiansen

[11] 4,331,383
[45] May 25, 1982

[54] LIGHT-WEIGHT MIRROR

[75] Inventor: Uwe Christiansen, Gelnhausen-Meerholz, Fed. Rep. of Germany

[73] Assignee: Heraeus Quarzschmelze GmbH, Hanau, Fed. Rep. of Germany

[21] Appl. No.: 163,358

[22] Filed: Jun. 26, 1980

[30] Foreign Application Priority Data

Jul. 21, 1979 [DE] Fed. Rep. of Germany ....... 2929714

[51] Int. Cl.³ ................ C03B 29/02; C03B 11/08; G02B 5/08
[52] U.S. Cl. ............................ 350/310; 65/36; 65/42; 156/308.2; 156/309.6; 350/320
[58] Field of Search ............. 156/89, 272, 290, 274, 156/308.2, 309.6; 65/36, 37, 38, 39, 42; 350/288, 293, 296, 298, 310, 320

[56] References Cited

U.S. PATENT DOCUMENTS

| | | | |
|---|---|---|---|
| 3,467,511 | 9/1969 | George | 65/36 |
| 3,728,186 | 4/1973 | Mohn | 156/153 |
| 3,840,417 | 10/1974 | Yager | 156/242 |

Primary Examiner—John E. Kittle
Attorney, Agent, or Firm—Sprung, Horn, Kramer & Woods

[57] ABSTRACT

A light-weight mirror comprising a fused-silica mirror plate and a cellular or honeycombed supporting structure made of fused silica or a quartzose material. As it is being welded or fused to the supporting structure, the mirror plate is supported by supporting elements comprising seating members which at elevated temperature do not react with fusted silica. The surface of the seating members facing the mirror plate may be plane or curved or domed. The seating members are made of graphite or zirconium oxide. The supporting elements may also be made entirely of graphite. After the supporting structure and the mirror plate have been welded together, the supporting elements are removed.

8 Claims, 4 Drawing Figures

LIGHT-WEIGHT MIRROR

BACKGROUND OF THE INVENTION

1. Field of the Invention

The invention relates to a light-weight mirror, particularly for astronomical telescopes, comprising a mirror plate made of fused silica and a cellular or honeycombed supporting structure made of fused silica or a quartzose material, which are immovably welded or fused to each other, wherein there are a plurality of open passages which start at the interface between the two and perforate the supporting structure.

2. Discussion of the Prior Art

Light-weight mirrors of this type are known from U.S. Pat. No. 3,728,186. In the light-weight mirror there disclosed, the supporting structure comprises a fused-silica plate having a plurality of through bores or passages. In that mirror, the mirror plate is sufficiently thick for viscous heated fused silica to penetrate in the form of lenslike protuberances into the openings of the passages as the mirror plate is being welded or fused to the supporting structure. With attendant enlargement of the cross-sectional area of the passages, the exponentially increasing penetration results in such deformation of the free surface of the mirror plate that it cannot be remedied by grinding and/or polishing and the entire mirror has to be discarded.

The present invention has been prompted by the growing need to reduce the total weight of the mirror as much as possible without sacrificing its good mechanical and optical properties.

This object of the invention is accomplished, in the case of a light-weight mirror of the type outlined above, in the mirror plate, from 2 to 20 mm thick, while being welded or fused to the supporting structure is supported by means of supporting elements which extend through the open passages and are provided at least at the end facing the mirror plate with a seating member which at elevated temperature does not react with fused silica and whose surface facing the mirror plate is plane, curved or domed, said supporting elements being subsequently removed. Seating members made of graphite have proved suitable, However, seating members made of zirconium oxide may also be used.

The end of the supporting structure remote from the mirror plate is advantageously welded or fused to a backing plate made of fused silica and provided with openings which are in register with the open passages of the supporting structure. In joining the backing plate to the supporting structure, too, it has been found helpful to use supporting elements of the type employed in accordance with the invention in joining the mirror plate to the supporting structure. Portions of the supporting elements remaining in the passages after welding or fusing can readily be removed if said elements are made of graphite, as is preferred, by incinerating them in a stream of oxygen at about 800° to 900° C.

Generally the cellular or honeycombed structure has pores or cells measuring at least 30 mm, preferably 50 to 150 mm in the transverse direction, i.e., diameter in the case of cylindrically shaped pores or cells. The walls of the honeycomb or cellular support structures are generally 1 to 6 mm in thickness, preferably 2 to 3 mm in thickness.

When domed seating members are used, lens-like depressions form in the underside of the mirror plate as it is being welded or fused to the supporting structure, and these depressions enhance the mechanical stability of the light-weight mirror. Similar depressions may also be produced in the backing plate on the side facing the supporting structure.

Light-weight mirrors in accordance with the invention offer the advantage of a substantial reduction in the overall weight of the mirror since the thickness of the mirror plate can be considerably reduced and the cross-sectional area of the open passages of the supporting structure can be increased to several hundred millimeters without there being any likelihood that the free surface of the mirror plate will become uneven and that the mechanical stability of the light-weight mirror will be reduced to such an extent that its fitness for use is impaired.

BRIEF DESCRIPTION OF DRAWINGS

Embodiments of the invention are illustrated in the accompanying drawings, wherein.

DESCRIPTION OF SPECIFIC EMBODIMENTS

Figure 1:
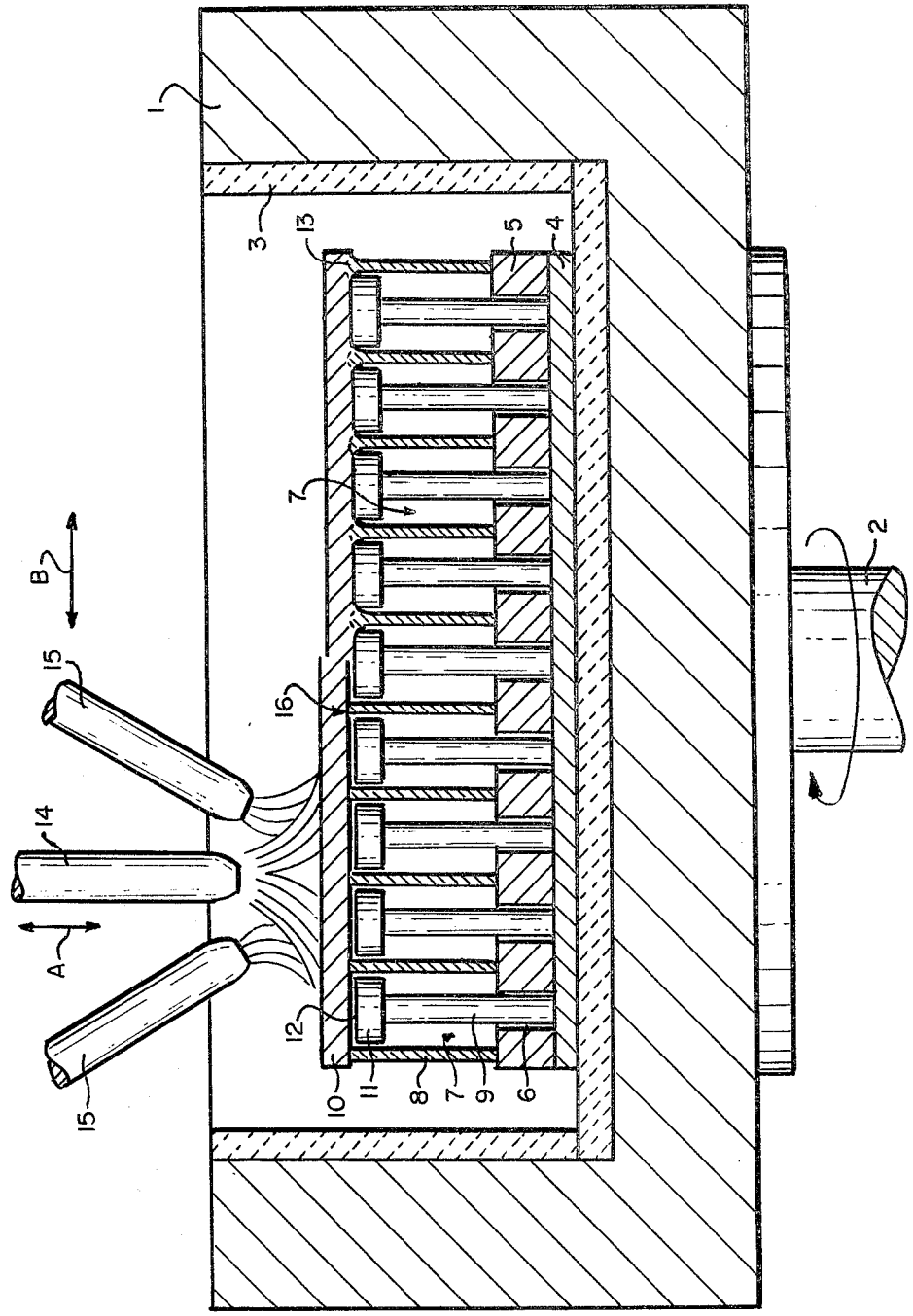
FIG. 1 is a vertical section through a furnace for the production of light-weight mirrors in accordance with the invention comprising a plane mirror plate and a supporting structure.

The vertical section of FIG. 1 shows the melting furnace with the mirror components to be fused together and the requisite supporting elements. The left half of the figure illustrates the state before, and the right half the state after the mirror components have been fused together.

The melting furnace 1, which is provided with a refractory lining 3, is mounted on the shaft 2 to rotate therewith. A graphite plate 4 which is coplanar with the bottom of the melting furnace 1 is placed on the lining 3. The guide plate disposed above the plate 4 is provided with guide holes 6 which accurately correspond to the center-to-center spacing of the passages 7 of the supporting structure 8. The holes 6 which accommodate the supporting elements 9 with their seating members 11, which serve to support the mirror plate 10 during fusing.

The length of the supporting elements 9 with their plane-surfaced seating members 11 must be from 0.05 to 1 cm less than the combined height of guide plate 5 and supporting structure 8 so that prior to fusing a gap 12 is formed between the mirror plate 10 and the seating members 11. This gap is necessary in order that the weight of the mirror plate 10 may exert a contact pressure on the future weld 13.

The mirror plate 10 and the end faces 16 of the supporting structure 8 are then heated to a temperature ranging from 1500° to 2000° C. by means of an arc produced between the cathode 14 and the anodes 15 by a conventional technique, such as the method used in U.S. Pat. No. 3,728,186. As indicated by the arrows A and B, the electrodes are adapted to be raised and lowered and to be moved sideways. The weight of the mirror plate 10 then compresses the weld 13 until the mirror plate 10 comes to abut on the seating members 11. This loading by the mirror plate 10 has the effect of enlarging the end faces 16, which imparts good strength properties to the finished mirror. After the mirror has been fused to the supporting structure, the graphite supporting elements with their graphite seating members are mechanically removed, if desired, or incinerated.

Figure 2:
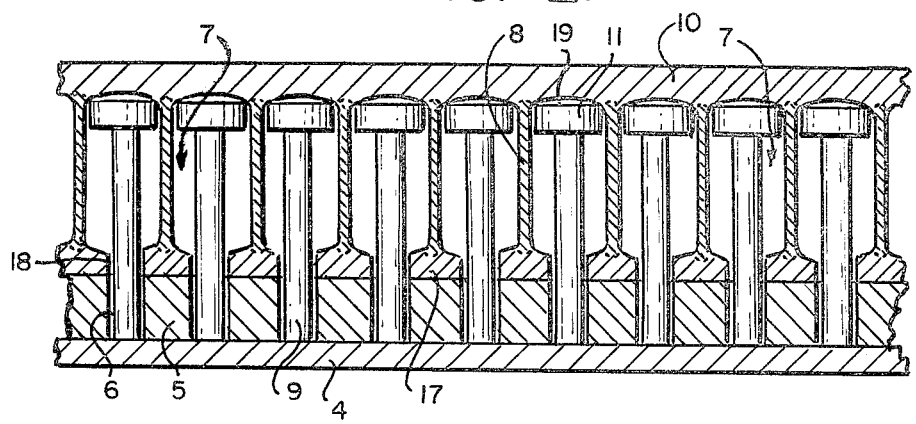
FIG. 2 is a vertical section through a portion of a light-weight mirror comprising a plane mirror plate, a supporting structure and a plane backing plate, after fusing.

The embodiment shown in FIG. 2 is illustrative of the fusing of the mirror plate 10 to the support structure 8, which is welded to a backing plate 17. The latter is first fused to the supporting structure 8 by the method described in connection with FIG. 1. After the supporting structure provided with the backing plate has been cooled off, vent holes 18 are drilled into the backing plate 17. These vent holes 18 extend as guide holes 6 into the guide plate 5.

The plate 4 disposed under the guide plate 5 forms the seating surface for the supporting elements 9 on whose top the seating members 11 having, for example, a lenslike dome 19, that is to say, a convex surface, are seated.

In assembling the individual components for the fusing on of the mirror plate 10, the guide plate 5 is first place onto the plate 4. The backing plate 17 with the holes 18, which is welded to the supporting structure 8, is then aligned with the guild holes 6 in the guide plate 5. The supporting elements 9 with the seating members 11 are inserted in the passages 7 and the holes 18 and 6 so as to be seated on the plate 4. The mirror plate 10 is then placed on them, care being taken to leave a gap 12 (not shown in FIG. 2), as in FIG. 1.

After the mirror plate has been fused to the supporting structure under the conditions described in connection with FIG. 1, lenslike impressions of the domes 19 are formed in the underside of the mirror plate 10. These lenslike depressions exhibited by the underside of the mirror plate after removal of the supporting elements with the seating members have the effect of improving the strength properties of the finished light-weight mirror.

Figure 3:
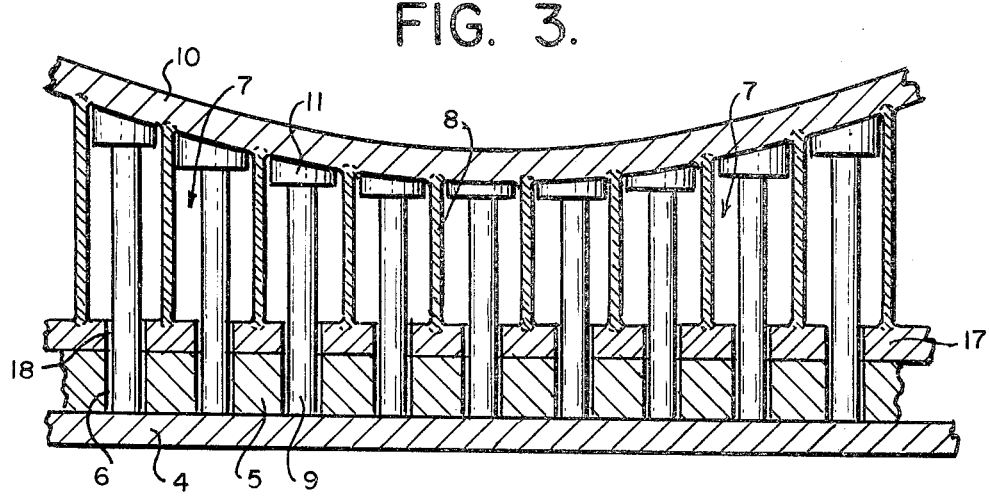
FIG. 3 is a vertical section through a portion of a light-weight mirror comprising a curved mirror plate, a supporting structure and a plane backing plate, after fusing.

The portion of the light-weight mirror shown in FIG. 3 comprises a concave mirror plate 10. The seating members 11 in this case are wedge-shaped or curved. The other components correspond to those shown in FIGS. 1 and 2.

Figure 4:
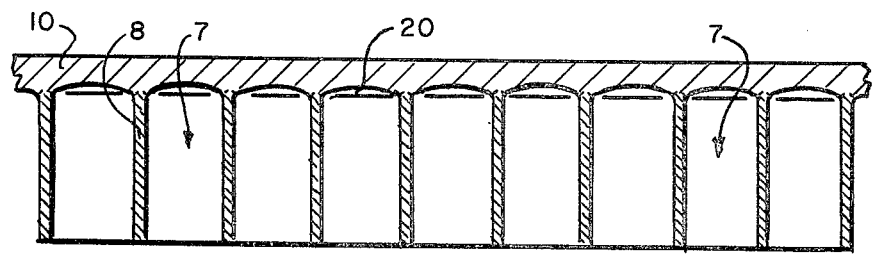
FIG. 4 is a vertical section through a ortion of a light-weight mirror comprising a plane mirror plate and a supporting structure, after removal of the supporting elements.

Shown in FIG. 4 is a portion of a light-weight mirror provided only with a mirror plate 10. The supporting structure 8 comprises passages 7 open at one end. The underside of the mirror plate exhibits lenslike depressions 20 such as formed when seating members as shown in FIG. 2 are used.

What is claimed is:

1. A method of producing a light-weight mirror, particularly for astronomical telescopes, which comprises welding or fusing a mirror plate made of fused silica to a cellular or honeycombed supporting structure made of fused silica or quartzose material wherein there are a plurality of open passages at the interface between said mirror plate and said supporting structure and said mirror plate has a thickness of 2 to 20 mm and while said mirror plate is being fused or welded to said supporting structure said supporting structure, in turn, is supported by supporting elements which extend through said open passages and are provided at least at the end facing said mirror plate with a seating member which does not react with fused silica, and is planar, dome-shaped or curved on the surface facing said mirror plate and is close to but is in out of contact relationship said mirror plate whereby when said mirror plate is heated at its interface with said supporting member a domed or curved shape is imparted to said interface, and thereafter said supporting elements are removed.

2. A method according to claim 1, wherein the mirror plate is provided with lenslike depressions on the side facing the supporting structure.

3. A method according to claim 1, wherein said seating member is made of graphite or zirconium oxide.

4. A method according to claim 1, wherein the end of said supporting structure remote from the mirror plate is welded to a backing plate made of fused silica which is provided with holes which are in register with said passages.

5. A method according to claim 4, wherein said backing plate has on the side facing the supporting structure lenslike depressions.

6. A method according to claim 1, wherein said supporting elements are made entirely of graphite.

7. A method according to claim 1, wherein said seating member is entirely disposed 0.05 to 1 cm away from said mirror plate prior to fusing said mirror plate to said supporting structure.

8. A light-weight mirror made by the method of claim 1.

* * * * *